Figure 1:
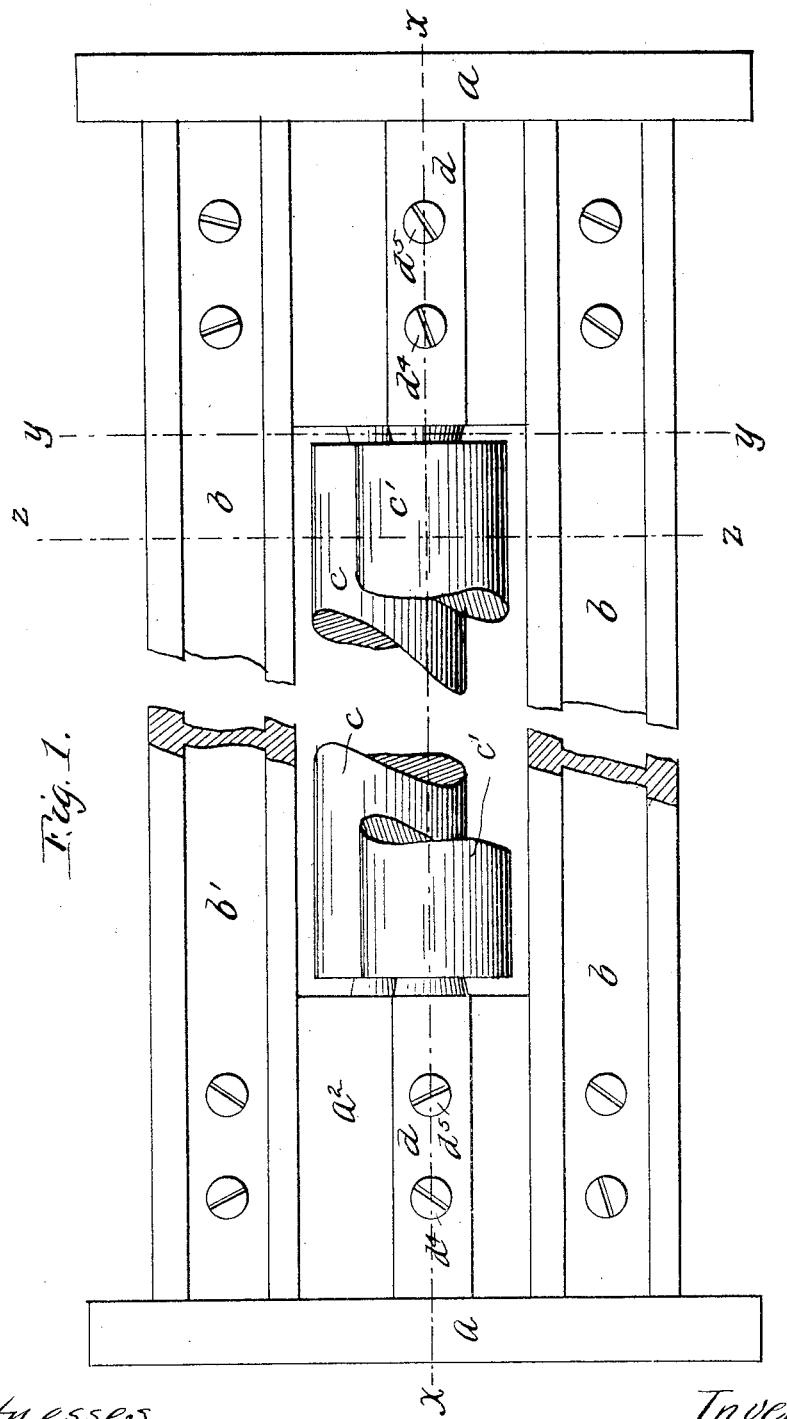

(No Model.) 11 Sheets—Sheet 1.
T. CAHILL.
PIANO FORTE ACTION.

No. 458,219. Patented Aug. 25, 1891.

Witnesses
Walter P. Keene.
Isadore Middleton

Inventor,
Thaddeus Cahill (No Model.)   11 Sheets—Sheet 3.
T. CAHILL.
PIANO FORTE ACTION.

No. 458,219.   Patented Aug. 25, 1891.

Witnesses
Walter P. Keene
Isadore Middleton

Inventor
Thaddeus Cahill (No Model.) 11 Sheets—Sheet 4.
T. CAHILL.
PIANO FORTE ACTION.

No. 458,219. Patented Aug. 25, 1891.

Witnesses
Walter P. Keene
Isadore Middleton

Inventor
Thaddeus Cahill (No Model.) 11 Sheets—Sheet 5.
T. CAHILL.
PIANO FORTE ACTION.

No. 458,219. Patented Aug. 25, 1891.

Witnesses
Walter P. Keene
Isadore Middleton

Inventor
Thaddeus Cahill (No Model.) 11 Sheets—Sheet 6.

T. CAHILL.
PIANO FORTE ACTION.

No. 458,219. Patented Aug. 25, 1891.

Witnesses
Walter P. Keene
Isadore Middleton

Inventor—
Thaddeus Cahill (No Model.) 11 Sheets—Sheet 7.
T. CAHILL.
PIANO FORTE ACTION.
No. 458,219. Patented Aug. 25, 1891.
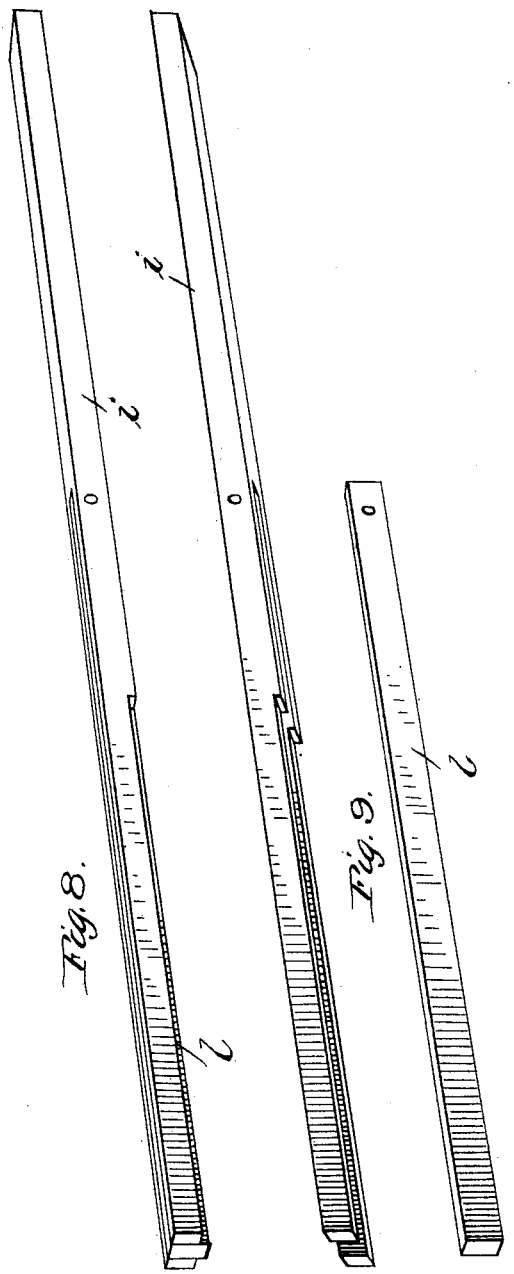
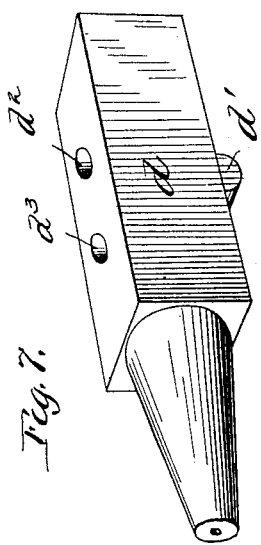
Witnesses
Walter P. Keene
Isadore Middleton
Inventor
Thaddeus Cahill
THE NORRIS PETERS CO., PHOTO-LITHO., WASHINGTON, D. C.

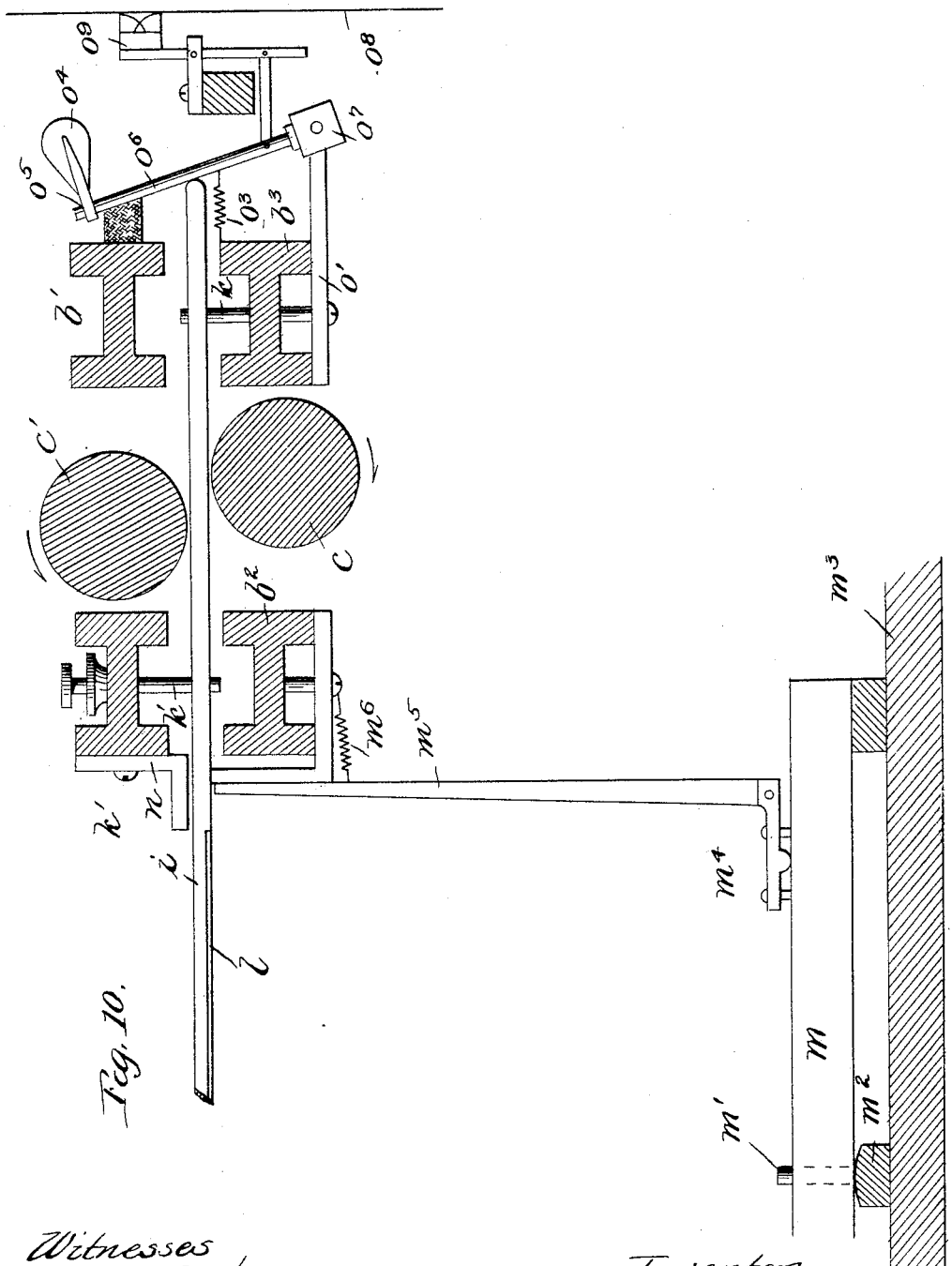

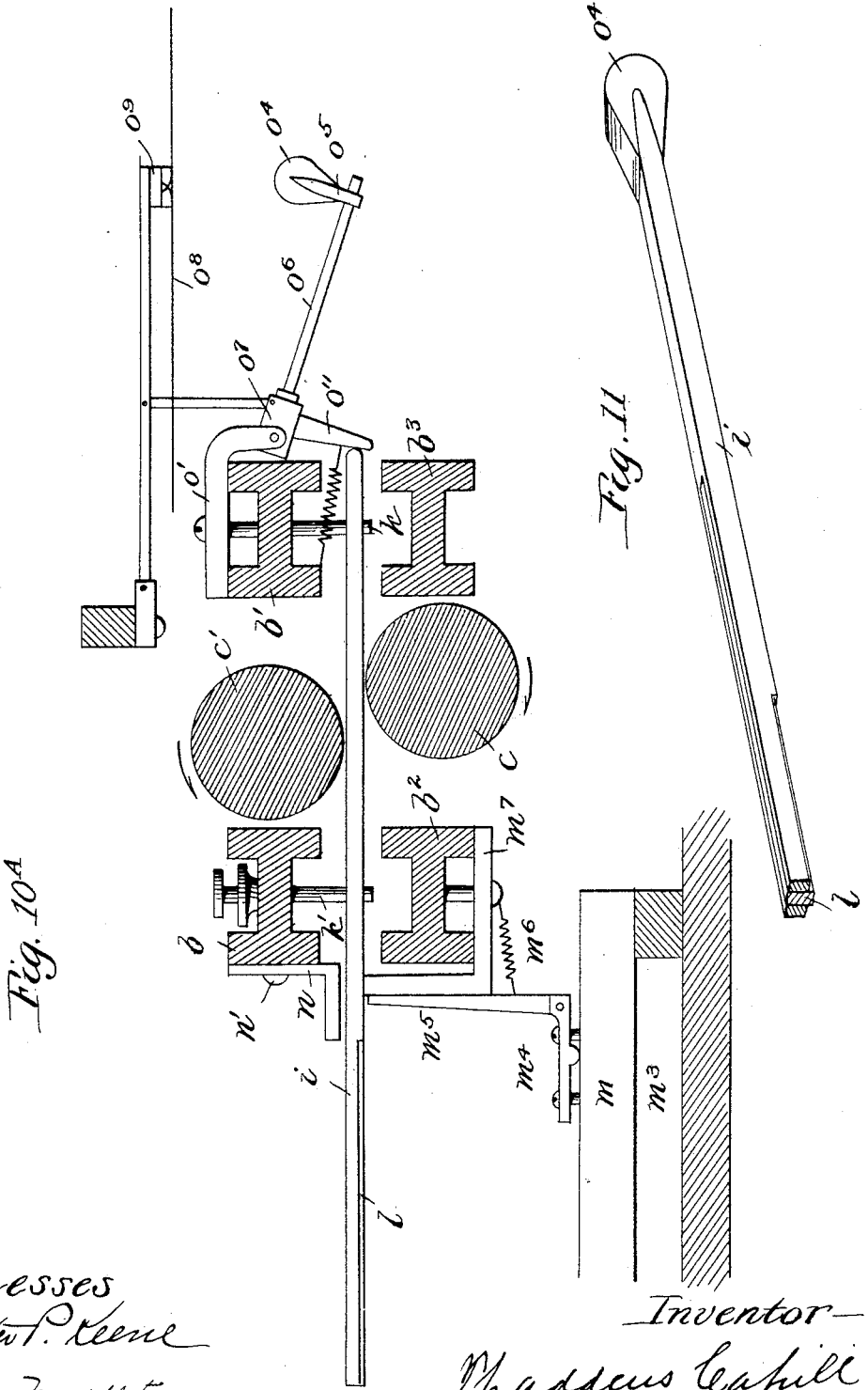

(No Model.)  11 Sheets—Sheet 10.

T. CAHILL.
PIANO FORTE ACTION.

No. 458,219.  Patented Aug. 25, 1891.

Witnesses
Walter P. Keene
Isadore Middleton

Inventor
Thaddeus Cahill (No Model.)
11 Sheets—Sheet 11.

T. CAHILL.
PIANO FORTE ACTION.

No. 458,219. Patented Aug. 25, 1891.

Witnesses
Walter P. Keene
Isadore Middleton

Inventor
Thaddeus Cahill

UNITED STATES PATENT OFFICE.

THADDEUS CAHILL, OF OBERLIN, OHIO.

PIANO-FORTE ACTION.

SPECIFICATION forming part of Letters Patent No. 458,219, dated August 25, 1891.

Original application filed March 1, 1888, Serial No. 265,886. Divided and this application filed March 17, 1891. Serial No. 385,417. (No model.)

*To all whom it may concern:*

Be it known that I, THADDEUS CAHILL, a citizen of the United States, residing at Oberlin, in the county of Lorain and State of Ohio, have invented certain new and useful Improvements in Piano-Fortes and other Similar Instruments, of which the following is a specification.

This application is a division of one filed by me on March 1, 1888, for improvements in organs and other keyed instruments, Serial No. 265,886.

In piano-fortes as now constructed the power for impelling the hammers and producing the tones is furnished by the fingers or hands of the performer. The amount of tone which the piano-forte can give out is limited to the amount of force which the performer can exert upon the keys; and for the production of powerful tones, and especially for the production of rapid successions of powerful tones, a degree of strength and flexibility of the hand is required which can only be attained by years of wearisome practice, and which is lost if this practice is discontinued.

The objects of my invention are to increase the volume of tone that may be given out by a piano-forte and to reduce the amount of force required to be exerted by the performer upon the keys. I do this by interposing a sympathetic power-action between the keys and the hammers, dampers, or other parts to be moved by the keys, so that the performer, by pressing upon the keys, has only to call the power into action to impel the hammers or other parts to be moved, instead of actually exerting the power required for this purpose himself, by his pressure upon the keys, as heretofore.

My invention consists in the parts, improvements, and combinations hereinafter described and claimed.

Figure 2:
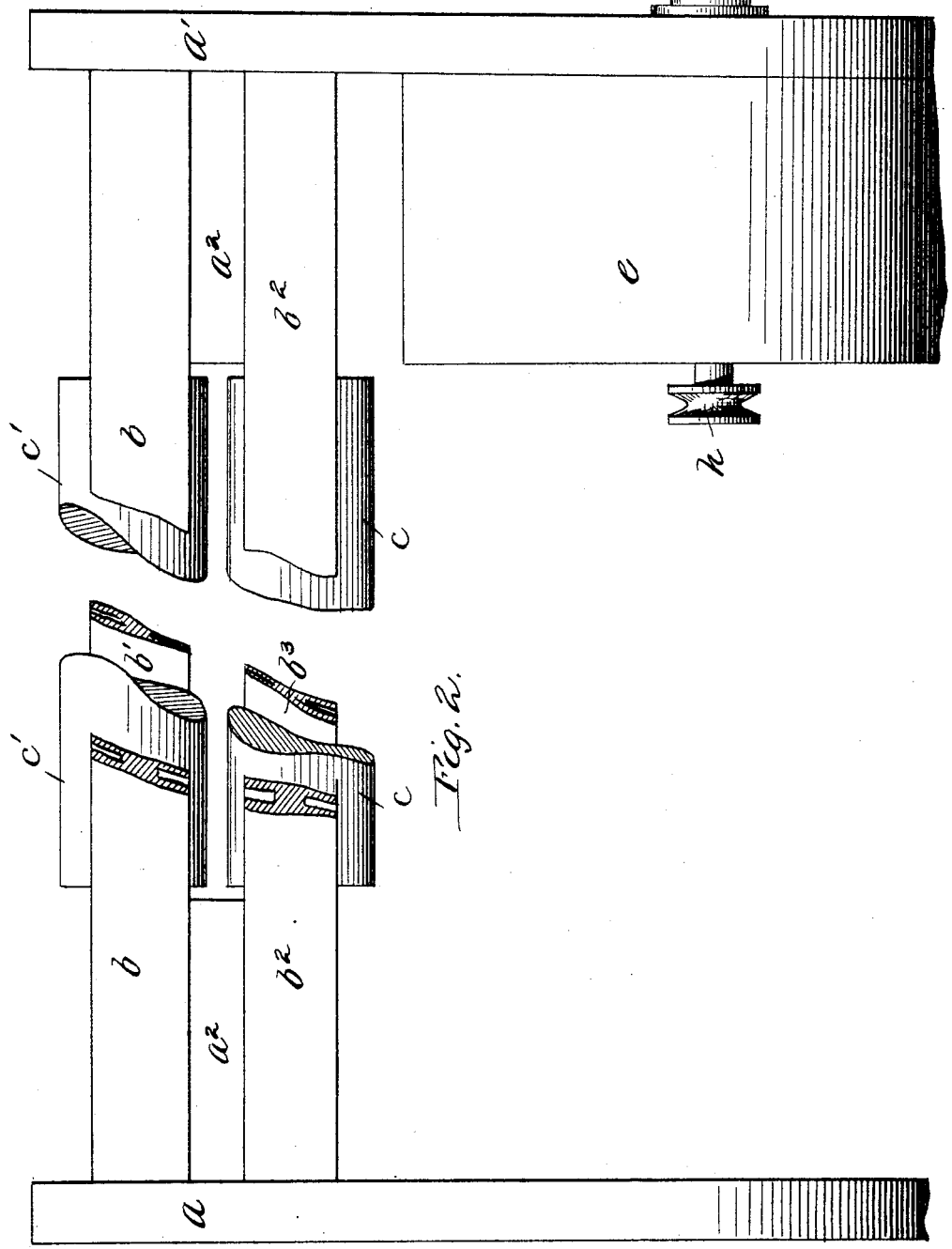
Figure 3:
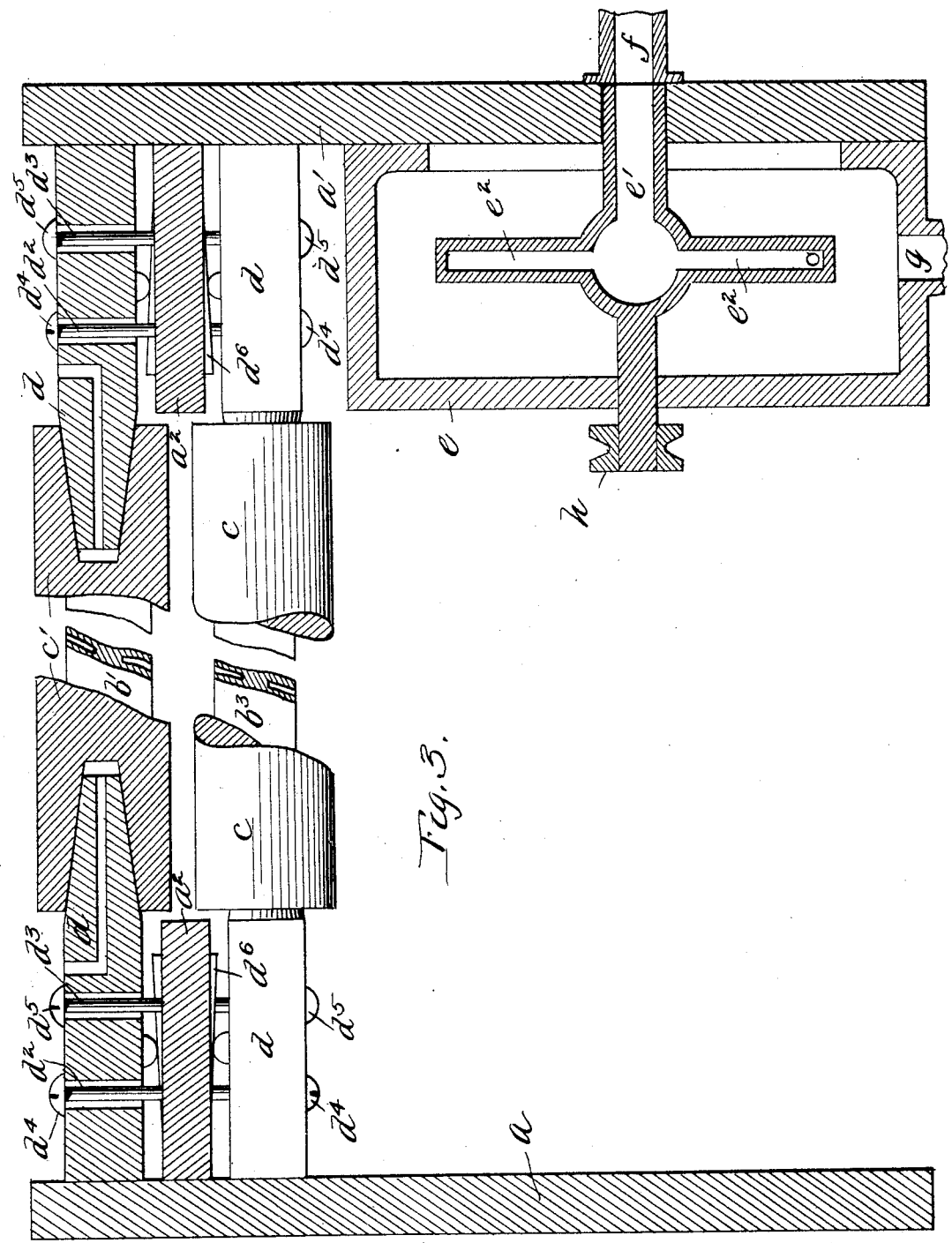
Figure 4:
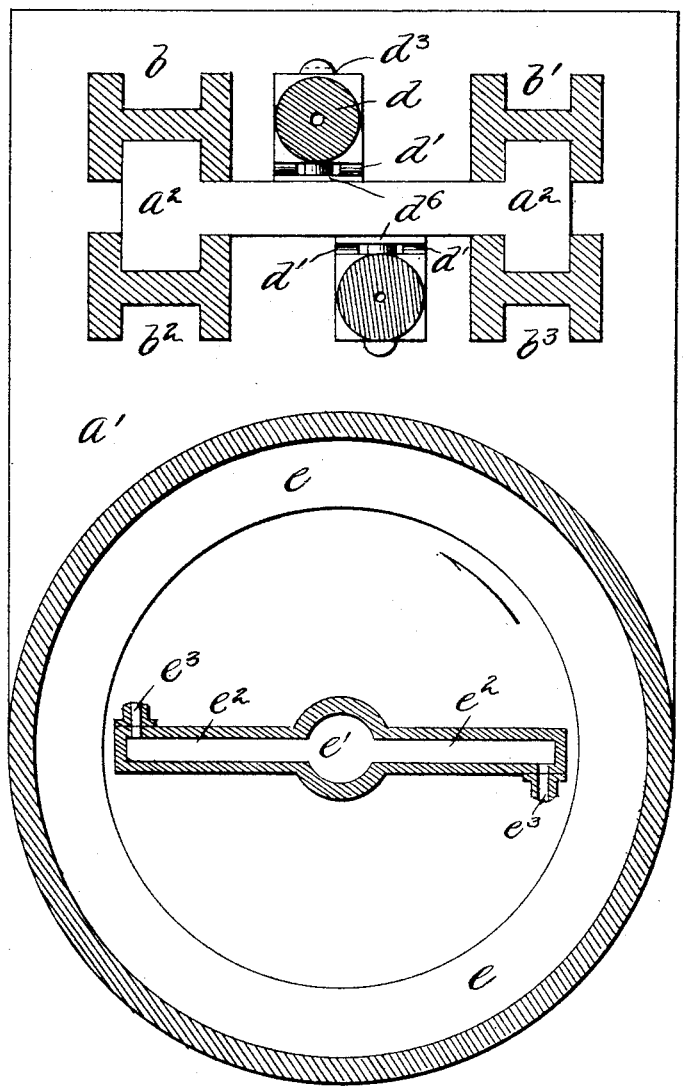
Figure 5:
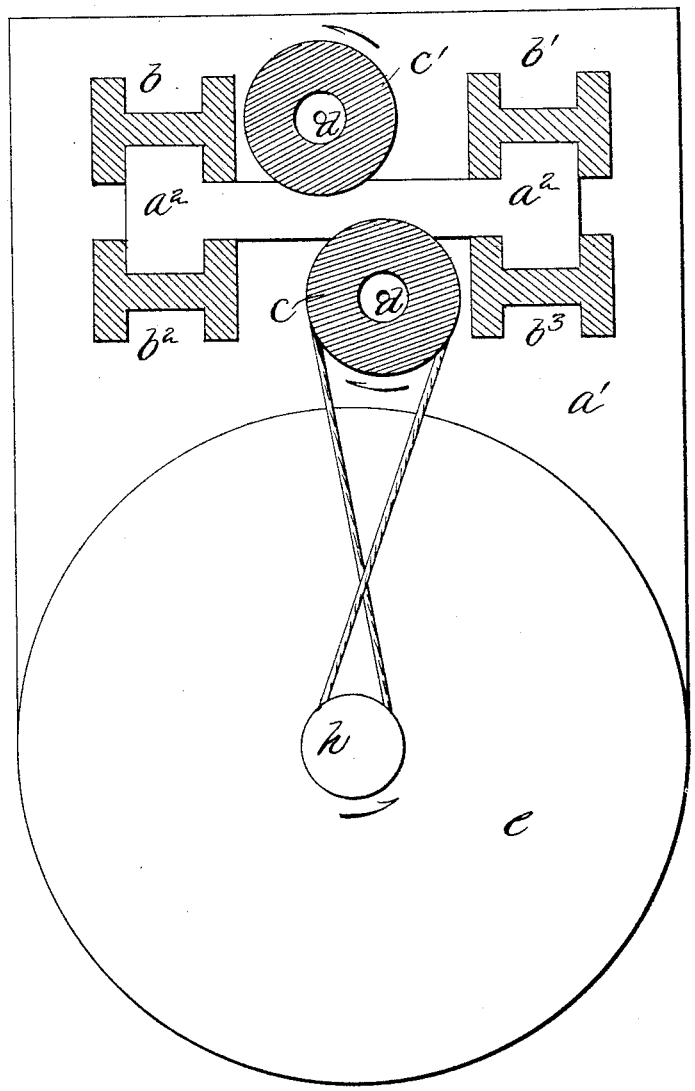
Figure 6:
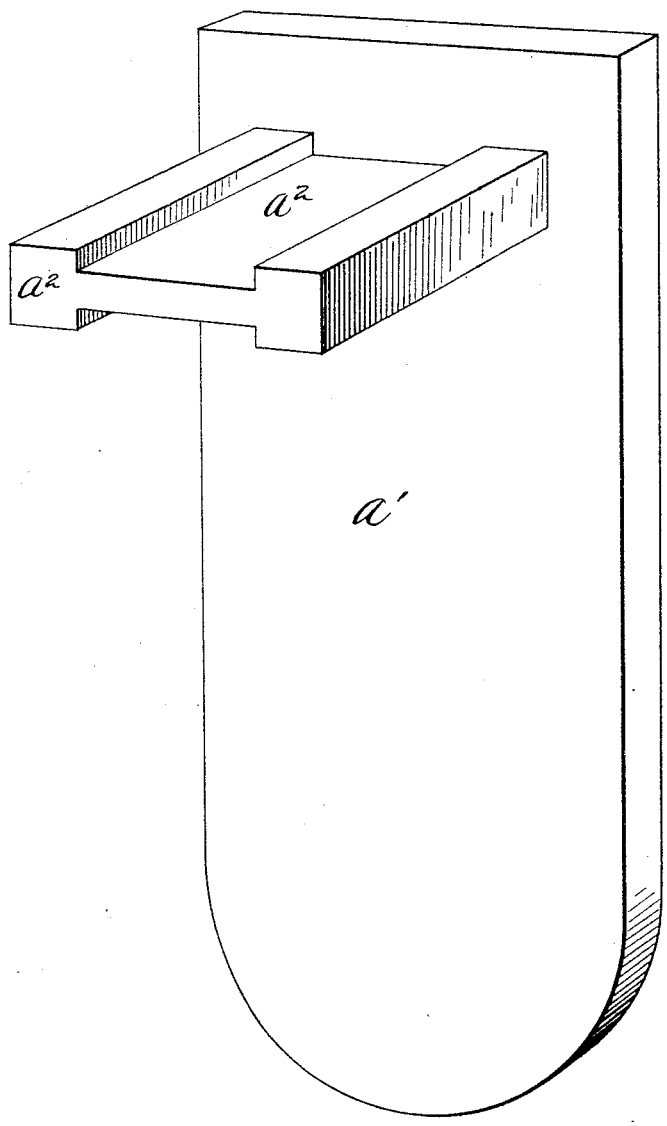
Figure 10B:
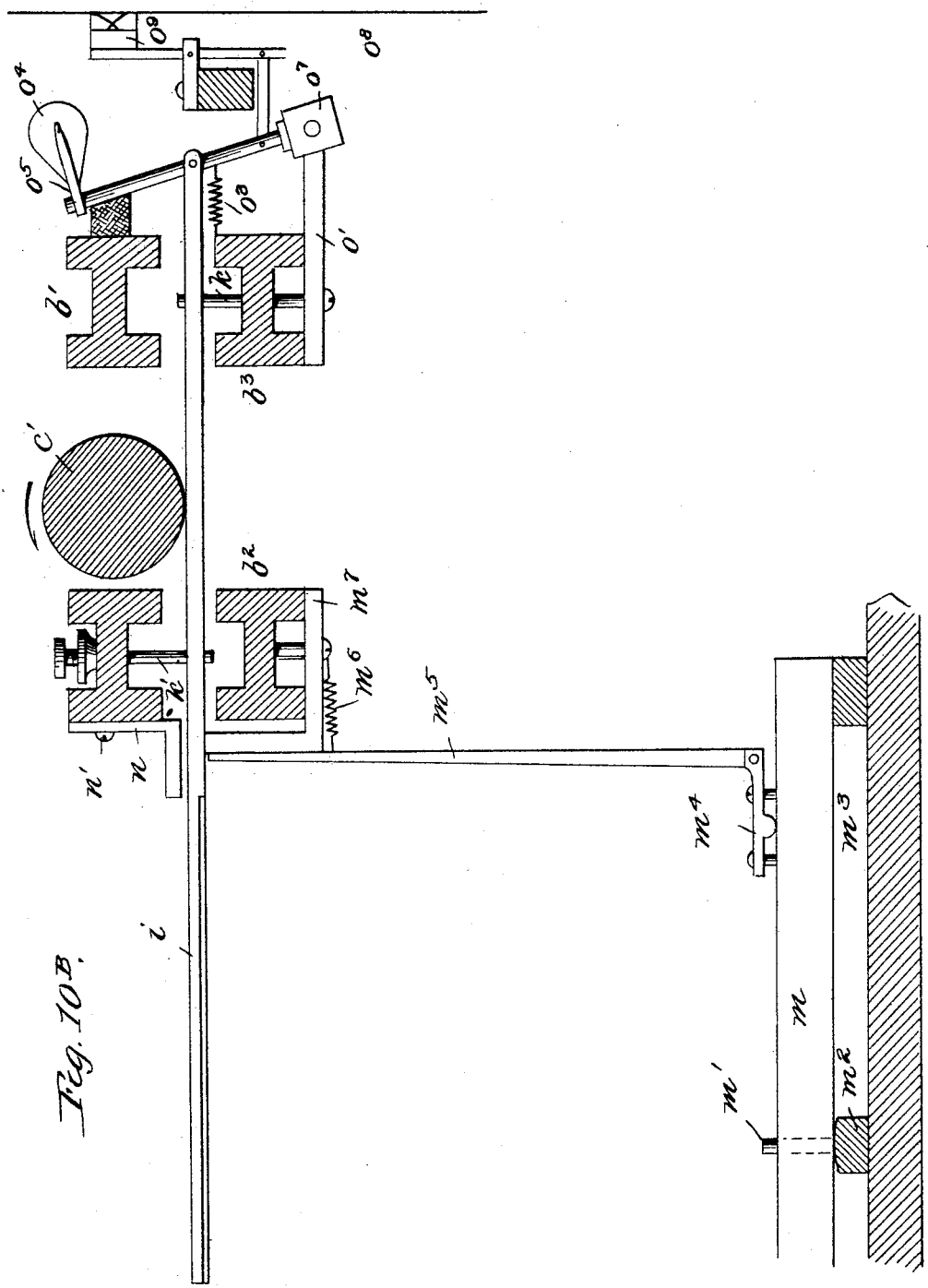
Figure 10C:
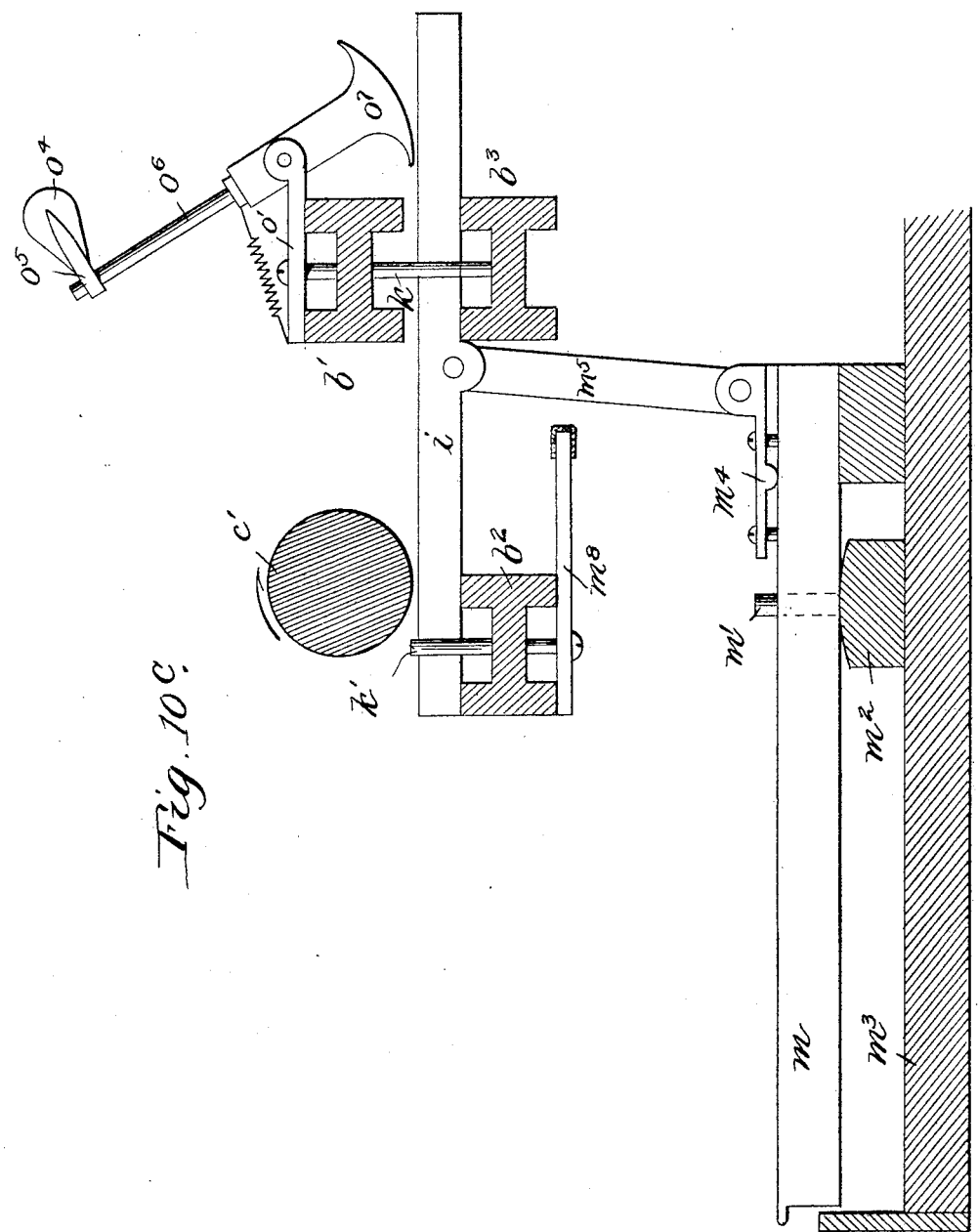

In the accompanying drawings, Figure 1 is a plan view of the action-frame and friction-drivers. Fig. 2 is a side elevation illustrating the action-frame, friction-drivers, and action-motor, or motor for impelling the friction-drivers, the lower part of the figure being broken away. Fig. 3 is a longitudinal section on the line $xx$, Fig. 1, part of the mechanism being shown in elevation, and in the three figures mentioned a part of each of the four double-T rails and of each of the two friction-drivers, similar in cross-section to the parts shown, and of much greater length than the parts shown, is broken away. Fig. 4 is a cross-section on the line $yy$; and Fig. 5, a cross-section on the line $zz$, Fig. 1. Fig. 6 is a detail view in perspective illustrating one of the end pieces of the action-frame. Fig. 7 is a similar view illustrating one of the pieces used as centers or supports for the friction-drivers. Fig. 8 is also a detail view in perspective illustrating the contact-piece, hereinafter described, which is interposed between the key and the hammer and pressed by the key, when the key is depressed by the performer, against the friction-driver or friction-drivers, and thereby moved, and serving when thus moved to impel the hammer, thus forming a frictional connection between the key and the hammer corresponding thereto. Fig. 9 is also a detail view in perspective illustrating the movable check-piece which is pivoted in and carried by the contact-piece above mentioned. Fig. 10 is a sectional view in elevation illustrating the manner in which the hammer and damper and contact-piece are connected with each other and with the action-frame and the relation which these parts bear to the friction-drivers and the relation which all bear to the key of an upright piano-forte. Fig. $10^a$ is a similar view showing the application of the invention to a grand or horizontal piano-forte. Figs. $10^b$ and $10^c$ are views similar to Fig. 10 and illustrate modifications or alternative forms of the device. Fig. 11 illustrates a contact-piece having the hammer-felt attached directly to it.

Similar letters refer to similar parts throughout the drawings.

The action-frame consists of two end pieces $a$ and $a'$ and four double-T rails $b$, $b'$, $b^2$, and $b^3$, which I prefer to make of iron or steel. The end pieces $a$ and $a'$ may be of cast-iron, and are each provided with an extension $a^2$ of the section shown, standing at right angles to the main part and to the keys and lying parallel with the rails $b$, $b'$, $b^2$, and $b^3$, which are attached to it in the manner shown by screws. A pair of shafts or cylinders $c$ and $c'$, respectively, are rotatively mounted upon the action-frame. They lie parallel with the before-mentioned rails $b$, $b'$, $b^2$, and $b^3$ and transverse to the keys of the instrument. The roll or cylinder $c$ lies with its axis somewhat lower than that of the cylinder $c'$ and somewhat nearer to the hammers and strings than the cylinder $c'$. Each of said cylinders has a conical hole in each of its ends, and is supported at each end by a center piece or trunnion $d$, turned coning at one end to fit the conical hole in the cylinder before mentioned and having two lips or nubs $d'$ $d'$, on which to swivel vertically, and having two holes $d^2$ and $d^3$ respectively drilled in it. Bolts marked, respectively, $d^4$ and $d^5$ pass through the holes marked, respectively, $d^2$ and $d^3$ into the horizontal part or main central rib of the extension $a^2$. A wedge-shaped plate $d^6$ is placed between the extension $a^2$ and the lips $d'$, so that the distance between the part $d$ and the extension $a^2$ may be regulated. The vertical angle of the part $d$ may be adjusted at will by raising or lowering the bolts $d^4$ and $d^5$.

The action-frame may be secured to the main frame of the instrument in any suitable manner.

A small water-motor for rotating the cylinders $c$ and $c'$ is attached to the end piece $a$ of the action-frame. The motor illustrated is substantially similar to what is known in hydraulics as "Barker's mill." It consists of a hollow cylindrical case $e$, secured by bolts to the vertical part of the end piece $a$ and a rotating hollow shaft $e'$, having one end closed and having hollow vertical arms $e^2$ $e^2$, adapted and arranged to discharge fluid through small and oppositely-opening pipes $e^3$ $e^3$, arranged as shown, so that internal pressure tends to rotate the shaft $e'$ in the direction of the arrow shown. Said shaft $e'$ passes out of the case $e$, one of its ends being supported by said case, which forms a journal for it, while its other end is supported by the end piece $a'$ and opens on the pipe $f$, which is shaped as shown and attached by screws to the end piece $a'$. Water under pressure is suppled to the shaft $e'$ by the pipe $f$, the passage of fluid through which is controlled by a valve. (Not shown in the drawings for lack of space.) An exhaust-pipe $g$, opening upon the lower part of the compartment formed by the cylindrical case $e$, serves to carry off the water that escapes from the arms $e^2$. A pulley $h$ is secured to the shaft $e'$ outside of the case $e$, and is connected with the shaft $c$ by a belt, so that said shaft moves in a direction contrary to watch-hands. The cylinder $c$ is connected with the cylinder $c'$ by a crossed belt, so that said shaft moves in the same direction as watch-hands.

The key is marked $m$, the pin upon which it is fulcrumed $m'$, the bar into which said pin is driven $m^2$, and the key-framing $m^3$. The little lever carried by the key and serving to regulate the position of the reach-up is marked $m^4$. The reach-up is marked $m^5$ and is held by a spring $m^6$ normally in contact with an adjustable stop $m^7$, which is secured to the rail $b^2$ by a screw passing through a slot in said stop, which gives facility for adjustment of said stop in a horizontal plane.

$o^4$ is the hammer-felt.
$o^5$ is the hammer-head.
$o^6$ is the hammer-shank.
$o^7$ is the hammer-butt, which is pivoted in the hammer-butt flange $o'$.
$o^8$ is the string.
$o^9$ is the damper.

The hammer is held in its normal position against the hammer-rest rail by the force of gravity and by the contractile spring $o^3$, one end of which is attached to the hammer-shank $o^6$ and the other to the rail $b^3$.

$i$ is the contact-piece, which serves when pressed by the key against the friction-driver or friction-drivers to take power therefrom and transmit it to the hammer. It is made of wood or other suitable material and shaped substantially as shown. It lies between the friction-driver cylinders $c$ and $c'$. Guide-pins $k$ and $k'$ serve to keep it free from displacement in the direction of the length of the rails $b$, $b'$, $b^2$, and $b^3$. Its rear end is in contact with the hammer-shank $o^6$ and its lower surface normally in contact with the adjustable stop $m^7$ and in close proximity to the reach-up $m^5$ and in contact therewith when the key is depressed. Said stop is thinned or hollowed out, as shown, from a point forward of the normal point of contact with the stop $m^7$ a distance nearly equal to its movement under the influence of the friction-cylinders or friction-drivers $c$ and $c'$.

The contact-piece $i$ is slotted or mortised out, as shown, to receive a movable check-piece $l$, which is pin-jointed to it, as shown. This piece $l$ is capable of motion, on the pin-joint as a center, with relation to the contact-piece $i$. Measured vertically the movable check-piece $l$ is thicker than the thinned or hollowed-out part of the contact-piece $i$.

$n$ is an adjustable stop or fixed check-piece lying above the movable check-piece $l$ and secured to the rail $b$ by a screw $n'$, passing through a slot in the vertical arm of the stop $n$.

When water under pressure is admitted to the hollow shaft $e'$ and arms $e^2$, it causes them and the pulley $h$ to rotate, and thus through the intervention of the belts before mentioned the friction-drivers $c$ and $c'$ are rotated in the direction of the arrows.

When the performer presses upon the key $m$, said key, through the intervention of the reach-up $m^5$, presses the contact-piece $i$ against the friction-drivers $c$ and $c'$, which immediately exert a bite or traction upon said contact-piece proportional to the pressure upon the key, but much greater than that pressure, and the contact-piece, in consequence of this traction, moves with the friction-drivers and throws the hammer against the string or strings with a force proportional to the pressure upon the key. When the contact-piece has almost or quite reached the limit of its positive movement—the movement that it executes under the influence of the traction exerted upon it by the friction-drivers $c$ and $c'$—its thinned or hollowed-out part comes over the top of the reach-up $m^5$ and the pressure which the reach-up has been transmitting to the contact-piece is instantly transferred to the movable check-piece $l$, which is thus pressed against the adjustable stop or fixed check-piece $n$, while the contact-piece is left free to drop away from contact with the friction-drivers and is freed from their traction. The hammer in recoiling from the string forces back the contact-piece $i$ and the check-piece $l$, attached thereto, and as the check-piece $l$ is pressed against the adjustable stop or fixed check-piece $n$ by the key acting through the intervention of the reach-up $m^5$ the force of the recoil is effectually broken by the friction arising from the contact of the movable check-piece $l$ with the fixed check-piece $n$, and the hammer, contact-piece, and movable check-piece soon come to rest, the hammer standing off from the strings a certain distance and leaving them free to vibrate. When the key is released from pressure, it returns to its normal position, and the other parts of the action in like manner return to their normal positions, in which positions they remain until the key is again pressed upon, when they repeat the actions already described.

In the modified construction illustrated in Fig. $10^b$ only one friction-driver is employed, and the contact-piece is pin-jointed to the hammer-shank. The construction and operation will be sufficiently clear from the drawings and the description already given. This form of action is easier to adjust and less liable to lose its adjustment than that with two friction-drivers; but the tractive power of the single friction-driver upon the contact-piece is not so great as that of the two contact friction-drivers; but it is amply sufficient for ordinary instruments.

In the modified construction illustrated in Fig. $10^c$ there is but one friction-driver. There are but three parallel rails in the action-frame. The hammer is provided with a curved butt. The reach-up is pin-jointed to the contact-piece, and the connection between the contact-piece and the hammer is a purely frictional one. So far as the contact-piece is concerned, there is no escapement in the device. The contact-piece is held in contact with the friction-driver so long as the key is depressed; but as to the hammer, there is an escapement and a check in the device. When the key is pressed upon by the performer, said key, through the intervention of the reach-up, presses the contact-piece against the friction-driver and against the arc-shaped hammer-butt, the center of the circle of which the arc is a part being the center of motion of the hammer-butt. The friction-driver at once exerts a traction on the contact-piece, and the contact-piece exerts a traction on the hammer-butt. In consequence of the first-mentioned traction the contact-piece is moved, and in consequence of the second traction mentioned the hammer-butt moves with the contact-piece and the hammer is thrown against the string. By the arrangement and surfacing of the parts and the leverage of the contact-piece the first traction is greater than the second. At about the instant the hammer strikes the string the contact-piece is arrested by the stop $m^8$, against which it is held by the traction of the cylindrical friction-driver. The hammer now recoils from the spring, and in so doing its curved butt slides upon the contact-piece. It will now be clear that the frictional connection between the contact-piece and the circular hammer-butt serves to convey power to the hammer to execute its blow, and, after its blow has been given, as an escapement to allow its retreat from the string and a check to prevent its undesired return. The device has the advantage of simplicity; but the constant pressure of the contact-piece against the friction-driver after the blow of the hammer has been given, and so long as the key is held down, tends both to a needless waste of power and an undue wearing of the proximate surfaces of the contact-piece and the friction-driver.

In the device illustrated in cross-section in Fig. 10 and before described, and in the device illustrated in cross-section in Fig. $10^b$, the escapement by which the contact-piece is freed from forcible contact with the friction-driver or friction-drivers and from the traction thereof so soon as the hammer has done its work, notwithstanding the fact that the pressure upon the key is still maintained, serves also for the hammer to permit its free recoil from the string as soon as it has delivered its blow, and the checking arrangement, serving to resist the retreat of the contact-piece, serves also as a check to resist the recoil of the hammer and bring it to rest. I prefer to construct the action in this way, so that the same escapement serves for both the hammer and the contact-piece; but this may be varied from in practice, if desired.

It will be seen that by setting the adjustable stop $m^7$ in or out the point of escapement may be regulated at will, and the movement which the contact-piece $i$ receives from the friction-driver or friction-drivers when pressed against them by the key may be limited and determined, as desired. The power of the friction-drivers may be made to follow the contact-piece and the hammer until the hammer touches the string, or it may be determined at any other point desired. By a careful adjustment of the action at this point the most delicate responsiveness may be secured.

The form of escapement shown is the one that I prefer to use; but any one of many other escapement devices may be substituted for it.

The only advantage of employing a separate adjustable stop or fixed check-piece $n$ for each key is the facility which it gives for adjustment. A single check-rail serving for the whole instrument might otherwise be used as well.

In the drawings I have shown a reach-up interposed between the key and the contact-piece $i$. This is convenient and advantageous, for the hammers generally stand a considerable distance above the keys, especially in the generally-used upright piano-forte; but the key might be made to act directly upon the contact-piece without the intervention of a reach-up or any other part whatever.

I have shown two forms of contact-piece. Many other forms may be used. The mere details of form and construction in this respect, as in others, may be altered at will to any extent. The contact-piece may be either stiff or flexible. In the original application of which this is a division I show a flexible contact-piece as a part of a sympathetic friction-driver action for a musical instrument; but I consider a stiff contact-piece best for a piano-forte action.

As I use the word "contact-piece" generally in this specification and always in the statement of claim forming part of the specification, said word "contact-piece" signifies simply a part or piece for contact with the friction-driver to be moved thereby and take power therefrom, and its details of form, shape, size, and proportion are unessential and may be varied as desired, and the words "part moved by the action of the key and the friction-driver" and other substantially similar expressions are used in the specification and in the statement of claim forming part thereof to denote a contact-piece moved by a traction which is the result of the joint action of the key and the friction-driver, the key serving to press the contact-piece against the friction-driver, thus calling the tractive power of the friction-driver into action and causing the contact-piece to be moved thereby.

The contact-piece may be connected with the hammer in any way desired. I have shown several modes. Others may be used. The hammer may be mounted directly on the contact-piece. One method of doing this is illustrated in Fig. $10^d$. The method illustrated in said figure, however, involves a high speed for the friction-drivers, and I do not recommend it to the public.

The pressure which the contact-piece exerts by reason of its weight upon the part with which it is normally in contact may of course be balanced off, if desired, in any suitable manner.

I have shown the contact-piece $i$ placed horizontally. It may of course be placed vertically. This is disadvantageous, in necessitating the use of a bell-crank lever between the key and the part $m^5$ or its equivalent that presses the contact-piece against the friction-driver. On the other hand, in a device having two friction-drivers, as in Fig. 10, the placing of the contact-piece vertically (one of the friction-drivers being of course then placed with its axis somewhat nearer to the strings than the axis of the other and the axis of the two rollers being of course on different levels) is advantageous, in rendering any balancing of the contact-piece $i$ unnecessary, since the contact-piece when standing vertically has no tendency to exert any pressure upon the friction-drivers, except as it is pressed against them by the key.

A rotating circular friction-driver, with its axis transverse to the keys, is the form and arrangement which I consider best and the one in consequence which I have illustrated; but other forms or arrangements of friction-driver might be used instead.

Other forms of water-motor may of course be used than that shown. A foot-power pedal may be used instead of it, the wheel operated by the foot-pedal being connected with the friction-drivers by belting, so as to run them. Foot-pedals are so old and well-known that any description of them would be superfluous.

With my action the play of the keys of a piano-forte may be reduced to any extent desired, and at the same time the pressure required to operate the keys may be greatly reduced and more powerful tones be produced than has been possible heretofore, and all this without any loss in the sympathy of the action. This reduction in the play of the key and in the pressure required for operating it render possible a marked increase in the rapidity of execution. It also relieves pianists from the large amount of wearisome practice of mere technique now necessary to develop and maintain in the fingers the strength requisite for the rapid execution of fortissimo passages, and the increased power of blow which the performer is enabled to bring to bear upon the springs renders possible an increase in the weight and number of these parts and in the volume of tone produced by the instrument. Thus a new field is opened to the pianist. Heretofore the power of his instrument has been limited to the power of his fingers. Three strings have been found sufficient to bear all the force that the muscles of the fingers can exert, and to the volume of tone thus given out the instrument has been limited, whether used in a parlor or a concert-hall. Now the number of strings may be increased to suit the hall, as the number of pipes in an organ is increased to suit the auditorium, and the power furnished by my action will bring any number of strings under the most perfect control of the performer. The instrument is rendered capable of effects hitherto impossible, both as to rapidity of execution and volume and grandeur of tone.

My action is applicable to key-board instruments generally. The contact-piece may be connected with the valves or other operative parts of an organ or other instrument in substantially the same manner in which they are connected with the hammers in the drawings or in any other known and suitable manner of connecting the actuating parts with the parts to be actuated. This will be easily understood by any one skilled in the art, and explanation is unnecessary; but I do not claim herein specifically the combination of a contact-piece with the valves of an organ. The combination of a contact-piece or its equivalent with valve mechanism in an organ forms the subject-matter, or part of the subject-matter, of the original application, Serial No. 265,886, filed March 1, 1888, of which application this is a division.

A part ultimately to be moved by or in consequence of the depression of the key forms an element of some of the combinations herein described and claimed. In a piano-forte the part ultimately to be moved by or in consequence of the depression of the key is the hammer; but my invention is applicable to other instruments. By these words "a part ultimately to be moved by or in consequence of the depression of the key" I refer to the last link in the chain which connects the performer with the actual tone-producing parts of the instrument.

By the "positive movement of the hammer" I mean the tone-producing movement of the hammer toward the strings. By the "positive movement of a part ultimately to be moved by or in consequence of the depression of the key" I mean the movement of the hammer or other tone-producing or tone-producer-controlling part which results in the production of tone.

I use the word "escapement" to denote the mechanism or arrangement of parts by which the hammer at or about the instant it strikes the string is freed from the power that impelled it against the string and permitted it to retreat, recoil, or escape from the string. I also use this word "escapement" to denote the mechanism or arrangement of parts by which the contact-piece is freed or permitted to escape from the traction of the friction-driver or friction-drivers after it has performed its positive or hammer-impelling movement under the influence of that traction. I also use the word "escapement" sometimes with reference to the mechanism or arrangement of parts by which both these functions are performed. Whether the word is used in the first sense mentioned or in the second or in the third will be clear from the context.

What I claim as my invention, and desire to secure by Letters Patent, is—

1. A piano-forte action including a key, a hammer, a friction-driver, and a contact-piece for contact with the friction-driver and for taking power therefrom, the key when depressed serving to press the contact-piece against the friction-driver, the friction-driver then serving to move the contact-piece, the contact-piece when thus moved serving to impel the hammer, said action having an escapement for the hammer, whereby the hammer is left free to retreat from the string after it has delivered its blow upon it, and a check whereby the hammer is arrested upon its retreat or recoil from the string and prevented from rebounding upon it.

2. A piano-forte action including a key, a hammer, a friction-driver, and a contact-piece for contact with the friction-driver and for taking power therefrom, the key when depressed serving to press the contact-piece against the friction-driver, the friction-driver then serving to move the contact-piece, the contact-piece when thus moved serving to impel the hammer, said action having an escapement for the contact-piece, whereby the contact-piece, after it has executed its positive or hammer-impelling movement under the influence of the friction-driver, is freed from the traction of the friction-driver.

3. A piano-forte action including a key, a hammer, a check-piece, a friction-driver, and a contact-piece for contact with the friction-driver and for taking power therefrom, the key when depressed serving to press the contact-piece against the friction-driver, the friction-driver then serving to move the contact-piece, the contact-piece serving, when thus moved, to impel the hammer, said action having an escapement whereby the pressure exerted by the key upon the contact-piece to press said piece against the friction-driver is transferred from said contact-piece to the check-piece after the contact-piece has received its positive or hammer-impelling movement from the friction-driver.

4. A piano-forte action including a key, a hammer, a friction-driver, and a contact-piece for contact with the friction-driver and for taking power therefrom, the key when depressed serving to press the contact-piece against the friction-driver, the friction-driver then serving to move the contact-piece, the contact-piece when thus moved serving to impel the hammer, said action having escapement mechanism both for the contact-piece and for the hammer, whereby the contact-piece, after it has executed its positive or hammer-impelling movement under the influence of the friction-driver, is freed from the traction of the friction-driver, and whereby the hammer is left free to retreat from the strings after it has delivered its blow upon them, and a check whereby the hammer is arrested upon its retreat or recoil from the string and prevented from rebounding upon it.

5. A piano-forte action including a key, a hammer, a movable check-piece, a friction-driver, and a contact-piece for contact with the friction-driver and for taking power therefrom, the key when depressed serving to press the contact-piece against the friction-driver, the friction-driver then serving to move the contact-piece, and the contact-piece serving to impel the hammer, said action having an escapement whereby the pressure exerted by the key upon the contact-piece to press said piece against the friction-driver is transferred from the contact-piece after said piece has received its positive movement from the friction-driver and has thrown the hammer toward or against the string to the movable check-piece before mentioned, said check-piece being connected with the hammer in such a manner that it is moved by the hammer in its recoil from the string, so that the recoil of the hammer from the string is checked by the pressure exerted upon this movable check-piece by the key, said movable check-piece being pressed against a fixed part by the action of the key.

6. In a key-board musical instrument and in combination, a fixed check-piece or check-rail, a rotating circular friction-driver, a key, and a contact-piece having a movable check-piece connected with it in a suitable manner, (as, for instance, by a pin-joint,) so that it moves with it and with relation to it, the key when depressed first serving to press the before-mentioned contact-piece against said friction-driver, whereby it is then moved, the key then serving to press the movable check-piece against the fixed check-piece or check-rail, substantially as described.

7. In a key-board musical instrument and in combination, a rotating circular friction-driver, a key, and a contact-piece having a surface for contact with the friction-driver and another surface or part of a surface for contact with the key or part by which the key acts upon it, and having one of these surfaces cut away or hollowed out at a certain point, so that after the key has pressed it against the friction-driver and it has been moved by the friction-driver into a certain position it escapes from or clears said friction-driver, substantially as described.

8. In a key-board musical instrument and in combination, a rotating circular friction-driver, a key, and a contact-piece, said contact-piece being pressed by the key when it (the key) is depressed against the friction-driver and being cut away, weakened, thinned, or hollowed out on the side on which it is acted on by the key or part through which the key acts upon it, so that after it has been pressed by the key against the friction-driver and moved forward by that into a certain position the key ceases to press it against the friction-driver, substantially as described.

9. In a key-board musical instrument and in combination, a rotating circular friction-driver, a fixed check-piece or check-rail, a key, and a contact-piece having a movable check-piece attached to it in a suitable manner, (as, for instance, by a pin-joint,) so that said check-piece moves with and with relation to the contact-piece, said contact-piece having a surface for contact with the friction-driver and another surface or part of a surface for contact with the key or part by which the key acts upon it, and having one of these surfaces cut away or hollowed out at a certain point, so that after the key has pressed it (said contact-piece) against the friction-driver and it (said contact-piece) has been moved by the friction-driver into a certain position the pressure of the key is transferred from said contact-piece to the before-mentioned movable check-piece attached to it, said movable check-piece being then pressed by the key against the before-mentioned fixed check-piece or check-rail, the contact-piece being thus released or suffered to escape from the friction-driver, so that it is no longer acted upon by it, and its motion being checked by the pressure of the key upon said movable check-piece, substantially as described.

10. In a key-board musical instrument and in combination, a rotating circular friction-driver, a fixed check-piece or check-rail, a key, and a contact-piece having a movable check-piece suitably attached to it, (as, for instance, by a pin-joint,) so that said check-piece moves with and with relation to the contact-piece, said contact-piece having a surface for contact with the friction-driver and another surface or part of a surface for contact with the key or part by which the key acts upon it, and having this last-named surface or part of a surface cut away or hollowed out at a certain point, so that after the key has pressed it (said contact-piece) against the friction-driver and it (said contact-piece) has been moved by the friction-driver into a certain position the pressure of the key is transferred from said contact-piece to the before-mentioned movable check-piece attached to it, said movable check-piece being then pressed by the key against the fixed check-piece or check-rail, the contact-piece being thus released or suffered to escape from the friction-driver, so that it is no longer acted upon by it, and its motion being checked by the pressure of the key upon said movable check-piece, substantially as described.

11. In a key-board musical instrument and in combination, a rotating circular friction-driver, a key, and a collection of parts moved by the conjoint action of said key and friction-driver, the key serving first to press one of said parts against the friction-driver, the parts being combined and operating in such a manner that after such part so pressed against the friction-driver has been moved by the friction-driver the pressure of the key is transferred to another part, the part first pressed by it against the friction-driver being left free to escape therefrom.

12. In a key-board musical instrument and in combination, a key, a friction-driver, a part moved by the friction-driver, and a check or resistance controlled by the key and serving to resist the return to its normal position of the before-mentioned part moved by the friction-driver.

13. In a key-board musical instrument, a power-action having a key, a friction-driver, a contact-piece, and an escapement, the key when depressed serving to press the contact-piece against the friction-driver, the friction-driver then serving to move such contact-piece, and the escapement serving after such contact-piece has been thus moved into a certain position to release it from the friction-driver.

14. In a key-board musical instrument, a power-action having a key, a friction-driver, a contact-piece, an escapement, and a check or resistance controlled by the key, the key when depressed serving to press the contact-piece against the friction-driver, the friction-driver then serving to move such contact-piece, the escapement serving after such contact-piece has been thus moved into a certain position to release it from the friction-driver, the check or resistance serving to resist the return of such contact-piece to its normal position.

15. In a key-board musical instrument, a key, a part (for instance, a hammer) ultimately to be moved by or in consequence of the depression of the key, and a power frictional connection interposed between the key and such part, said frictional connection being formed by the key pressing a contact-piece against a friction-driver, said contact-piece being connected with the part ultimately to be moved, so that it gives said last-named part its positive movement while it (the contact-piece) is moving under the influence of the friction arising from its contact with the friction-driver under the pressure of the key.

16. In a key-board musical instrument, a power-action including a key, a friction-driver, and a contact-piece, the key when depressed serving to press such contact-piece against the friction-driver, the friction-driver then serving to move it, and means for limiting and determining the movement which said contact-piece receives from the friction-driver and for holding it at rest thereafter so long as the key is held down by the performer.

17. In an action for a key-board musical instrument, a key, a part (for instance, a hammer) ultimately to be moved by or in consequence of the depression of the key, and means for giving to said part a single positive movement whenever the key is depressed, said means including a friction-driver and a part moved by the joint action of the key and the friction-driver, and means for limiting and determining the movement which said part receives from the friction-driver and for holding it at rest thereafter so long as the key is depressed.

18. In a key-board musical instrument, a power-action including a key, a friction-driver, a part moved by the joint action of the key and the friction-driver and connected with the part ultimately to be moved by or in consequence of the depression of the key in such a manner that it moves said part, means for limiting and determining the movement which the part moved by the action of the key and the friction-driver executes under the influence of the friction-driver and for holding said part at rest thereafter so long as the key is depressed, and an escapement whereby the part ultimately to be moved by or in consequence of the depression of the key is left free to retreat somewhat from the position into which it is moved by the action of the friction-driver.

19. In a key-board musical instrument, a power-action including a key, a friction-driver, a part moved by the action of the key and the friction-driver and connected with the part ultimately to be moved by or in consequence of the depression of the key in such a manner that it moves said part, an escapement whereby said part ultimately to be moved by or in consequence of the depression of the key is left free to retreat somewhat from the position into which it is moved by the action of the friction-driver, and a check whereby said part ultimately to be moved is arrested during its retreat from the position into which it was moved by the friction-driver and held motionless thereafter so long as the key is depressed.

20. In a piano-forte action, a key, a hammer, and means for giving to said hammer a single positive movement whenever the key is depressed, said means including a friction-driver and a part moved by the action of the key and the friction-driver, the key acting when depressed to press said part against the friction-driver, said friction-driver then serving to move it.

21. In a piano-forte action, a key, a hammer, and means for giving said hammer a single positive movement whenever the key is depressed, said means including a friction-driver and a part moved by the action of the key and the friction-driver, and means for limiting and determining the movement which said part receives from the friction-driver and for holding it at rest thereafter so long as the key is depressed by the performer.

22. In a piano-forte, a power-action including a key, a hammer, a friction-driver, a part moved by the joint action of the key and the friction-driver and connected with the hammer so that it moves it, means for limiting and determining the movement which the part moved by the action of the key and the friction-driver executes under the influence of the friction-driver and for holding said part at rest thereafter so long as the key is depressed, and an escapement whereby the hammer is left free to retreat somewhat from the position into which it is moved by the action of the friction-driver.

In testimony whereof I have hereunto set my hand, at Washington, in the District of Columbia, this 17th day of March, A. D. 1891.

THADDEUS CAHILL.

Witnesses:
WALTER DONALDSON,
F. L. MIDDLETON.